Aug. 8, 1950
J. F. DECKER
2,517,638
ELECTRICAL CIRCUITS FOR TEST METERS
Filed May 8, 1946
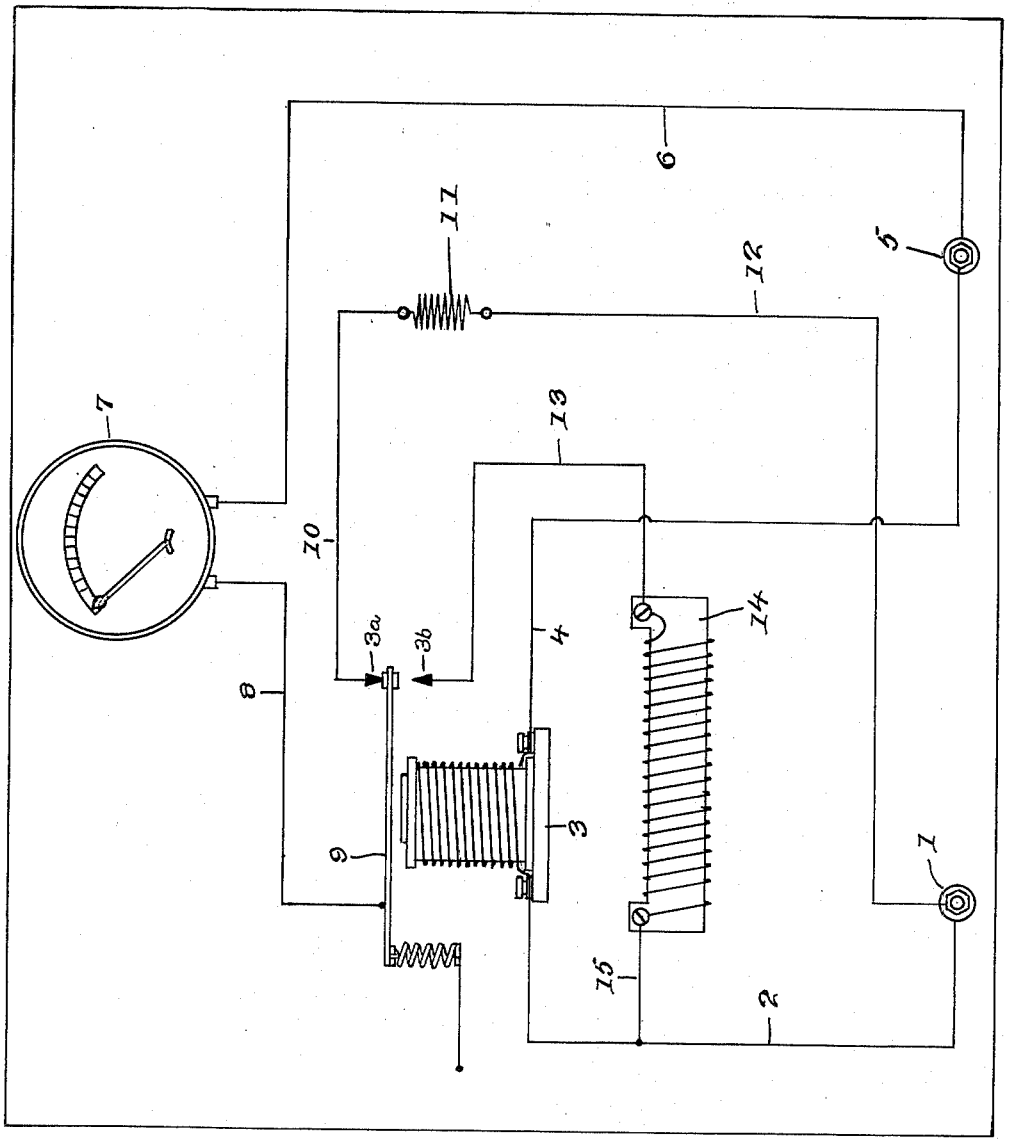
INVENTOR.
John F. Decker
BY Victor J. Evans &Co.
ATTORNEYS Patented Aug. 8, 1950

2,517,638

UNITED STATES PATENT OFFICE 2,517,638

ELECTRICAL CIRCUITS FOR TEST METERS

John F. Decker, Albany, N. Y.

Application May 8, 1946, Serial No. 668,085

1 Claim. (Cl. 171—95)

My present invention relates to an improvement in electrical circuits for test meters and has for an object to provide a testing circuit comprising an ammeter and an automatic means for controlling the voltage measuring range of the circuit, in order that the ammeter will not be burned out by high voltage; the automatic means including a relay connected across the terminals of the testing circuit whereby the relay will operate to select resistances in the testing circuit to compensate for different ranges of voltages to prevent the burning out of the meter.

In the drawing, the figure is a diagrammatic view of the testing circuit, in accordance with my invention.

In the figure, I have shown a practical embodiment of my invention but it will be understood that various changes and alterations may be made within the purview of the appended claim, without departing from the true scope and spirit of the invention in its broader aspect.

Referring now to the drawing my invention, as it is exemplified therein, is comprised in a test lead terminal which is connected by wire 2 to one side of a relay coil 3 that has its other side connected by a wire 4 with a second test lead terminal 5. The terminal 1 is also connected by a wire 12 to one side of a resistor 11, which has its other side connected by a wire 10 to the upper fixed contact 3a, of the relay 3; the movable armature 3', of the latter, being connected by a wire 8 to one terminal of an ammeter 7, while the other terminal of the ammeter is connected by a wire 6 to the test lead terminal 5. A second resistance 14, of a greater ohmic value than that of the resistor 11, has one end connected by a wire 15 to the wire 2, at a point between the test lead terminal 1 and the coil of the relay 3, and its other end by a wire 13 to the lower fixed contact 3b, of the relay.

The relay is designed to be responsive to voltage potentials only in excess of 10 volts although it is obvious that any desirable range may be selected.

In the operation of the testing device, as thus constituted, and assuming that the voltage of the circuit to be tested is within the prescribed range, i. e., under 10 volts, the current will, for instance, flow from terminal 1 by way of wire 12, the resistor 11 (approximate value 9950 ohms), the wire 10, the relay contact 3a, the relay, the armature 9, the wire 8 to the meter 7, and from the latter, by way of the wire 6 to the terminal 5. Thus the circuit under test will have its current flow measured and the meter 7 will indicate its value in milliamps, by the movement of the needle with relation to the scale.

If however, the potential voltage of the circuit under test should exceed 10 volts, current will flow in the testing circuit from terminal 1 by way of the wire 2, the coil of the relay 3 and the wire 4 to the test lead terminal 5, thus energizing the relay and causing the armature 9 to close on the contact 3b as long as the test lead terminals are connected to the circuit under test.

With the relay 3 energized and the armature 9 closed on the contact 3b, current in the testing circuit will flow from terminal 1 by way of the wire 2, the wire 15, to the resistance 14 (approximate value 49,950 ohms), thence by way of the wire 13, the relay contact 3b, the relay armature 9 and the wire 8 to the meter 7. From the meter 7, the current flows by way of the wire 6 to the test lead terminal 5.

By the use of the circuit and the arrangement of its instrumentalities as described, it will be apparent that the switching of the resistances 11 and 14 relatively to the meter 7, from one resistor to the other as selected by the relay 3, the measurement of the potential of the circuit under test, will be entirely automatic, except for the labor involved in the establishment of electrical connections between the test lead terminals 1 and 5 and the circuit to be tested.

Obviously other resistance values may be employed in the circuit, and the number of the resistances is not limited to the two as shown.

Having thus fully described my invention what I claim as new and desire to secure by Letters Patent is:

An electrical testing device for measuring variations in the potential of a circuit, comprising a test meter, a pair of test lead terminals, a relay having an armature electrically connected to one side of said meter and movable relatively to a pair of fixed contacts and its coil connected across said terminals, said meter having its other side connected to one of said terminals, a resistance of a relatively low ohmic value connected between one of said fixed contacts and said other terminal, and a second resistance of a higher ohmic value connected between said other terminal and the remaining of said fixed contacts.

JOHN F. DECKER.

REFERENCES CITED

The following references are of record in the file of this patent:

UNITED STATES PATENTS

| Number | Name | Date |
|---|---|---|
| 2,400,190 | Clark | May 14, 1946 |

FOREIGN PATENTS

| Number | Country | Date |
|---|---|---|
| 406,360 | Great Britain | Feb. 26, 1934 |
| 432,366 | Germany | Aug. 3, 1926 |